April 16, 1929.  A. H. SHOEMAKER  1,709,493
PNEUMATIC BUMPER FOR AUTOMOBILES
Filed Dec. 29, 1926
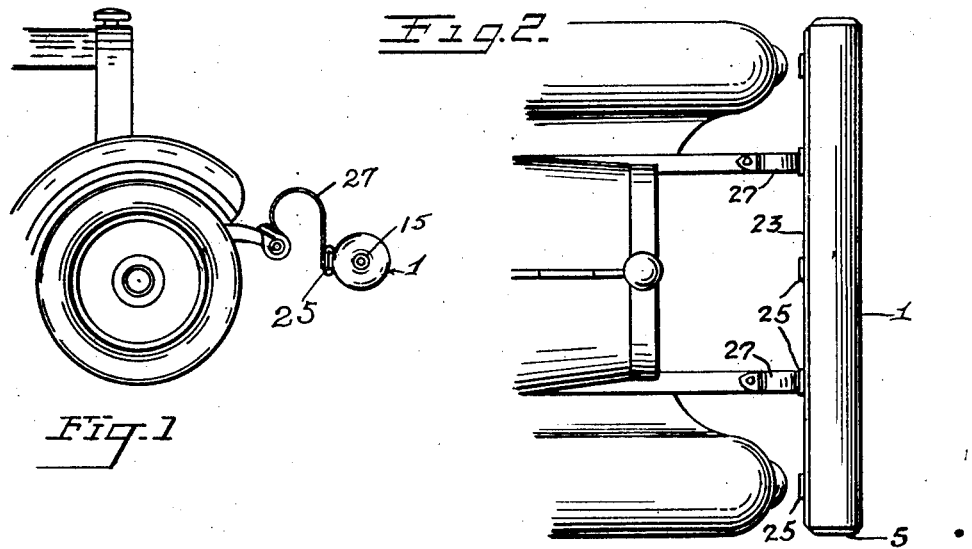
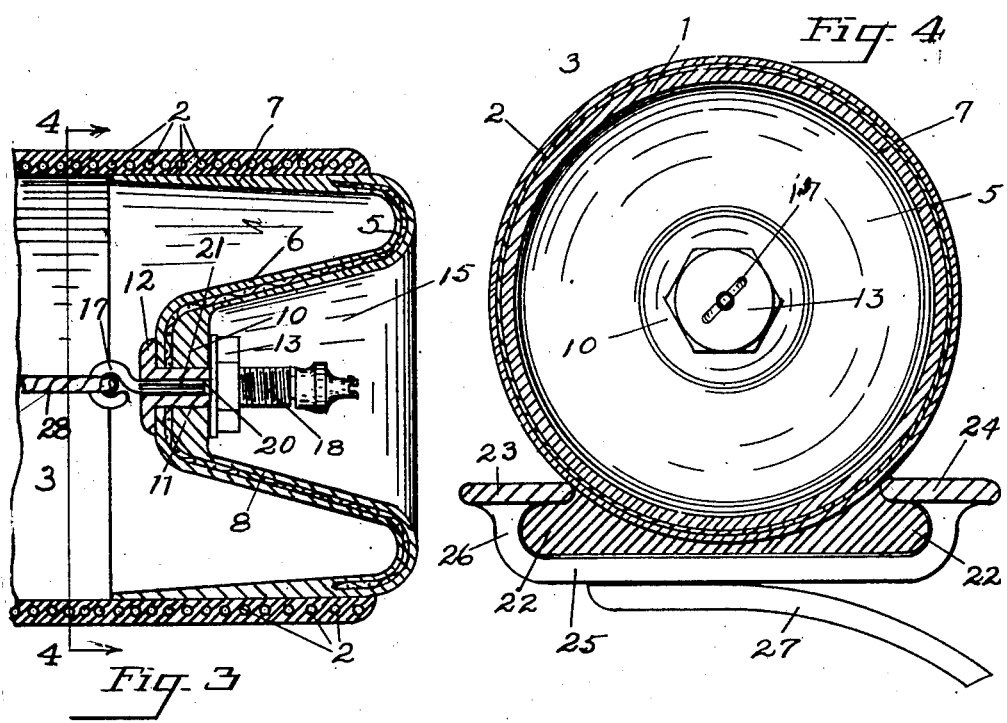
Inventor:
Alvin H. Shoemaker
By his Attorney  Horace Barnes Patented Apr. 16, 1929.

1,709,493

UNITED STATES PATENT OFFICE.

ALVIN H. SHOEMAKER, OF SEATTLE, WASHINGTON.

PNEUMATIC BUMPER FOR AUTOMOBILES.

Application filed December 29, 1926. Serial No. 157,709.

This invention relates to improvements in pneumatic bumpers for automobiles, and particularly to that type described and claimed in my prior patent application, Serial No. 112,212, filed May 28, 1926.

The object of the present improvements is the provision of a bumper of the class described, of simple tubular construction, to contain air under pressure, and including devices for mounting the same upon the car.

A further object of the invention is the provision of a tubular pneumatic bumper of the class described in combination with end walls of depressed form, together with devices for tying the same together.

A still further object of the invention is to provide a pneumatic bumper supported upon spaced steel bars in a novel manner, whereby the bumper is afforded a yieldable backing to more completely absorb the shocks incurred without damage to the bumper or car.

Other objects and advantages of my invention, and objects relating to details of construction and arrangement of parts, will be readily apparent in the course of the detailed description to follow.

The accompanying drawings illustrate by way of example a preferred form of my invention, in which:

Figure 1 is a view in side elevation of the forward part of an automobile upon which a bumper embodying my invention is mounted.

Fig. 2 is a plan view of the same.

Fig. 3 is a fragmentary view in horizontal section showing one end of my improved bumper detached.

Fig. 4 is a view in cross section of the bumper taken as on line 4—4 of Fig. 3.

Referring to said views, the reference numeral 1 indicates a tubular pneumatic casing of rubber composition having reinforcing cords 2 imbedded in its circular wall. Said cords are disposed transversely of the casing in a sheet or may be wound spirally thereabout in substantially parallel relation in any transverse section. There being no longitudinal or diagonal cords or fabric in the casing, the latter is free to stretch longitudinally, while the circularly wound cords retain the air pressure contained within the interior chamber 3 and maintain the casing in its circular configuration.

The opposite ends of said casing are closed by end walls 5 of cup-like formation, of rubber or rubber-containing reinforcing fabric, as at 6. A circular skirt 7 is formed on each said end wall adapted to enter the ends of the tubular casing to which they are vulcanized. The central portion of the end walls is depressed, as at 8, and formed with a centrally disposed, thickened portion 10 which is apertured in the longitudinal axis thereof and of the casing to receive a metal, screw threaded stud 11 having a head 12 on its inner end and a nut 13 on its outer end within the cupped depression 15, whereby the stud may be secured in said aperture to prevent the leakage of air.

From its inner end said stud is formed with a screw threaded recess in which an eye-screw 17 may be engaged. At one end of the casing, as shown in Fig. 3, the stud 11 may serve as a pneumatic valve extending outwardly in the cup 15, as at 18, containing a valve chamber of well-known type for the introduction of air under pressure within the casing and communicating by a bore 20 with the interior chamber of the casing through a slot 21 formed in the respective eye-screw. Upon one side of the casing material of firmer composition is molded thereon to form oppositely disposed beads 22.

Supporting devices for said bumper casing may consist in parallel spring steel bars 23 and 24 spaced apart and rigidly secured in parallel horizontal relation by spaced tie-straps 25 welded or otherwise rigidly secured at their opposite ends to said bars. Said bars are disposed on the tie-straps 25 so that their inner adjacent edges overhang the tie-bar and are distanced therefrom through the provision of outwardly directed necks 26 of the tie-straps to afford oppositely disposed channels in which the beads 22 of the casing are respectively received.

The rotundity of the casing extends inwardly of the vertical plane of said bars and overhangs the latter exteriorly thereof so that when the casing is inflated the beads will be firmly seated in said channels and guarded against accidental or other removal until the casing is again deflated. Spring brackets 27 may be secured to certain of the tie-straps at one end and at their opposite end connected to the automobile frame.

Within the casing chamber an axially directed tie-cord 28 is connected at its opposite ends to the eye-screws 17 in taut condition to maintain the depressed end walls 8 in their innermost depressed position and to resist any outward pressure thereof from the compressed air contained within the casing. In the construction of the casing and end walls as described the circular cords 2 extend to the extremities of the casing, thereby protecting it to the same extent throughout its length. The vulnerable end walls of the casing are folded inwardly where they, as well as the valve stem, are safeguarded against collision with an obstacle by the outer walls of the casing. This is a valuable feature of my improved construction, for the reason that the extremities of a bumper are usually more liable to damage than other portions thereof. The same construction also provides a pleasing finish and appearance for the ends of the bumper.

With the bumper mounted in operative position as described and inflated, it will afford a thorough-going protection to an automobile against collision. The casing with its pneumatic shock-absorbing qualities and the spring bars 23 and 24 supporting the same at its rear and reinforcing the casing by its yielding qualities afford a construction that will absorb almost any shock likely to be encountered without serious damage to the car or its occupants. The casing with its capabilities of stretching in longitudinal directions is not liable to rupture under sudden or severe shock as would be likely to occur in a casing that was bound in longitudinal directions.

Having described my invention, what I claim, is:

1. An automobile bumper consisting in a casing of single-tube construction, end walls in the extremities of said casing, the central portion of said end walls being depressed within the casing, and means to mount said casing upon an automobile.

2. An automobile bumper consisting in a casing of single-tube construction, end walls in the extremities of said casing, the central portion of said end walls being depressed within the casing, studs secured to said central portions, a tie-cord extending longitudinally interiorly of the casing and securing said end-walls together, and means to mount said casing upon an automobile.

3. An automobile bumper consisting in a casing of single-tube construction, end walls in the extremities of said casing, the central portion of said end walls being depressed within the casing, resilient metal bars mounted on the car, and means to secure said casing to said bars.

4. An automobile bumper consisting in a casing of single-tube construction, end walls in the extremities of said casing, the central portion of said end walls being depressed within the casing, studs secured to said central portions, a tie-cord extending longitudinally interiorly of the casing and securing said end walls together, resilient metal bars mounted on the car, and means to secure said casing to said bars.

5. An automobile bumper, consisting in a casing of tubular construction having reinforcing cords extending circularly and transversely in its peripheral walls, the ends of said casing being closed to afford a pneumatic chamber, longitudinally disposed beads molded on the exterior of said casing, a pair of resilient metal bars secured together in spaced apart relation and adapted to receive said beads to secure the casing therebetween, and means to mount said bars upon an automobile.

6. An automobile bumper, consisting in a casing of tubular construction having reinforcing cords extending circularly and transversely in its peripheral walls, the ends of said casing being closed to afford a pneumatic chamber, said end walls being tied together, longitudinally disposed beads molded on the exterior of said casing, a pair of resilient metal bars secured together in spaced apart relation and adapted to receive said beads to secure the casing therebetween, and means to mount said bars upon an automobile.

7. An automobile bumper consisting in a casing of tubular construction having reinforcing cords extending circularly and transversely in its peripheral walls, walls molded in the ends of said casing providing a pneumatic chamber, said end walls being depressed at their centers within the extremities of said casing, longitudinally disposed beads molded on the exterior of said casing, a pair of resilient metal bars secured together in spaced apart relation and adapted to receive said beads to secure the casing therebetween, and means to mount said bars upon an automobile.

8. An automobile bumper consisting in a casing of tubular construction having reinforcing cords extending circularly and transversely in its peripheral walls, walls molded in the ends of said casing providing a pneumatic chamber, said end walls being depressed at their centers within the extremities of said casing, a metal stud secured to each said end-wall center within said chamber, a tie-cord secured to said studs tying said end walls together, longitudinally disposed beads molded on the exterior of said casing, a pair of resilient metal bars secured together in spaced apart relation and adapted to receive said beads to secure the casing therebetween, and means to mount said bars upon an automobile.

9. An automobile bumper, consisting in a casing of tubular construction having reinforcing cords extending circularly and transversely in its peripheral walls, walls molded in the ends of said casing providing a pneumatic chamber, said end walls being depressed at their centers within the extremities of said casing, a metal stud secured to each said end-wall center within said chamber, a tie-cord secured to said studs tying said end walls together, one of said studs affording means for admitting air within said chamber, longitudinally disposed beads molded on the exterior of said casing, a pair of resilient metal bars secured together in spaced apart relation and adapted to receive said beads to secure the casing therebetween, and means to mount said bars upon an automobile.

10. In an automobile bumper, the combination with a pneumatic casing having attachment beads upon its exterior wall, of a metal support for said casing adapted to engage said beads and to afford a resilient backing for the entire length of the casing.

ALVIN H. SHOEMAKER.